Dec. 26, 1939.  R. HOLMBOE  2,184,643
INDICATOR FOR LIQUID FLOW
Filed July 22, 1938
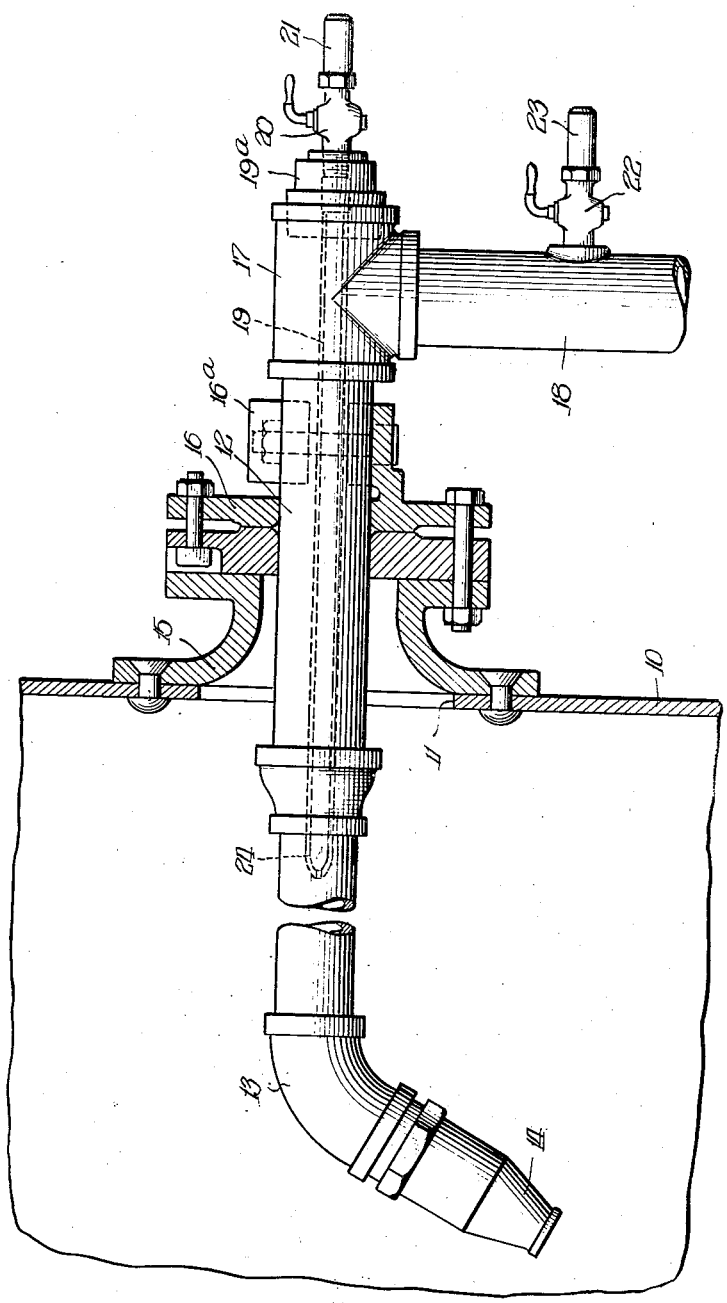
Inventor:
Ralph Holmboe,
By Wilkinson, Huxley, Byron & Knight
attys.

Patented Dec. 26, 1939

2,184,643

UNITED STATES PATENT OFFICE 2,184,643

INDICATOR FOR LIQUID FLOW

Ralph Holmboe, Chicago, Ill., assignor to H. A. Brassert & Company, Chicago, Ill., a corporation of Illinois Application July 22, 1938, Serial No. 220,604

1 Claim. (Cl. 137—102)

The present invention relates to improvements in indicators for liquid flow.

More particularly the present invention relates to means for indicating whether or not water or other liquid is passing through nozzles or the like which are inaccessible under operating conditions. In connection with blast furnace gas washing, for example, it is common practice to install a series of spray nozzles in gas washers. On account of the quality of the water usually found around steel plants, these nozzles sometimes plug up and unless some indicating means is provided the operators are unable to determine just how said nozzles are operating.

An object of the present invention is to provide an improved means for indicating whether liquid is flowing through a conduit.

A further object is to provide an indicator which is cheap to manufacture, simple in operation and not likely to get out of order, for indicating whether or not liquid is flowing through a conduit.

A further object is to provide a device of the kind above referred to well adapted to meet the needs of commercial operation.

The one figure of the drawing illustrates one embodiment of the present invention in sectional elevation.

The numeral 10 indicates a wall of a chamber which may be a gas washer. Said wall is provided with an aperture 11 for the reception of a pipe 12. Interiorly of the chamber 10 the pipe is provided with an elbow 13 for holding the nozzle 14 at the desired angle. The numeral 15 indicates a flange surrounding the aperture 11, which flange will be secured to the wall of the chamber 10, and will have associated therewith packing and clamping means, indicated as a whole by the numeral 16, for holding the pipe 12 in proper position relative to the aperture 11. Said packing and clamping means includes the clamp 16a for holding said pipe 12 while permitting adjustment thereof longitudinally and circumferentially of said pipe. The outer extremity of the pipe 12 is provided with a union 17, to which is connected the liquid supply pipe 18.

Disposed coaxially with the pipe 12 and union 17 is the conduit 19, which extends for a material distance from said union 17 toward the nozzle end of the pipe 12.

Mounted in the outer extremity of the union 17 is the reducing plug 19a, to the outer extremity of which is connected the valve 20 leading to the pipe 21. Connected to the supply pipe 18 is the valve 22 leading to the pipe 23. Said pipes 21 and 23 may open to the atmosphere, or, if preferred, may be connected to a manometer (not shown). The end of the conduit 19 adjacent to the nozzle 14, which end is indicated by the numeral 24, may be drawn down slightly in size, but the orifice from the end 24 of the pipe 19 should preferably be as large as or larger than the orifice through the valve 20.

The mode of operation of the above described embodiment of the present invention is substantially as follows. Water will be admitted through the supply pipe 18 and will be discharged through the nozzle 14. The passage of this water past the orifice at the end 24 of the conduit 19 causes a suction within the conduit 19 due to the velocity head of said water. If valves 20 and 22 are both open, water will flow through both of said valves and through the pipes 21 and 23. However, due to the suction referred to, assuming equal areas of opening of the valves 20 and 22, the flow of water back through the conduit 19 and pipe 21 will be less than that through the valve 22 and pipe 23. Accordingly, when said valves 20 and 22 are opened to the same extent, the operator has no difficulty in telling by the difference in flow from the pipes 21 and 23 if the nozzle 14 is operating properly. If the nozzle 14 should become plugged, the velocity head producing suction within the conduit 19 is no longer existent and the static pressure is the same on valve 20 as on valve 22, in which case the flow from the two pipes 21 and 23 will be approximately equal.

For ordinary purposes the length of the streams projected from the pipes 21 and 23 will be sufficient indications for the operator to determine whether or not the associated nozzle 14 is operating properly. If more accurate measurements are desired, the pipes 21 and 23 may be connected to a manometer which will indicate the relation between the pressures within said pipes 21 and 23.

Though a preferred embodiment of the present invention has been described in detail, many modifications will occur to those skilled in the art. It is intended to cover all such modifications that fall within the scope of the appended claim.

What is claimed is—

In combination, a nozzle, a pipe for supplying liquid to said nozzle, a fluid supply member for supplying liquid to said pipe, a conduit coaxially disposed within said pipe, said conduit having an orifice at its end adjacent to said nozzle and a discharge outlet at the other end thereof, a discharge outlet connected to said liquid supply member, and valves adapted to be opened to provide equal discharge areas for controlling said outlets.

RALPH HOLMBOE.